UNITED STATES PATENT OFFICE.

CHARLES H. FANCHER, OF SAN FRANCISCO, CALIFORNIA, ASSIGNOR TO HIMSELF AND FRANK A. J. DISS, OF SAME PLACE.

IMPROVEMENT IN FORMING AND GAGING BUTTER-ROLLS.

Specification forming part of Letters Patent No. 137,064, dated March 25, 1873.

*To all whom it may concern:*

Be it known that I, CHARLES H. FANCHER, of San Francisco city and county, State of California, have invented an Improved Process and Apparatus for Converting Butter into Rolls; and I do hereby declare the following description and accompanying drawing are sufficient to enable any person skilled in the art or science to which it most nearly appertains to make and use my said invention or improvement without further invention or experiment.

My invention relates to a new process and devices for converting butter which has been packed in bulk into merchantable rolls without disturbing the grain or molecular arrangement of the particles.

In order to more fully illustrate and explain my invention, reference is had to the accompanying drawing forming a part of this specification, in which—

Figure 1:
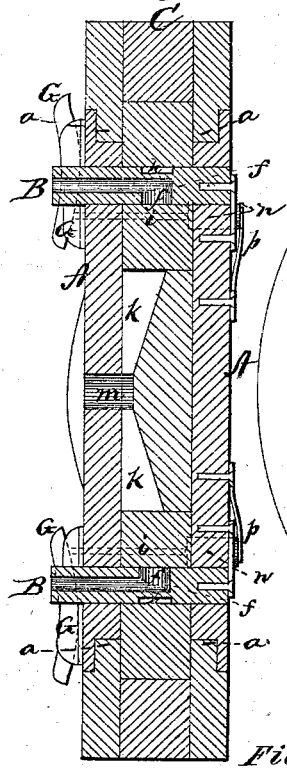
Figure 2:
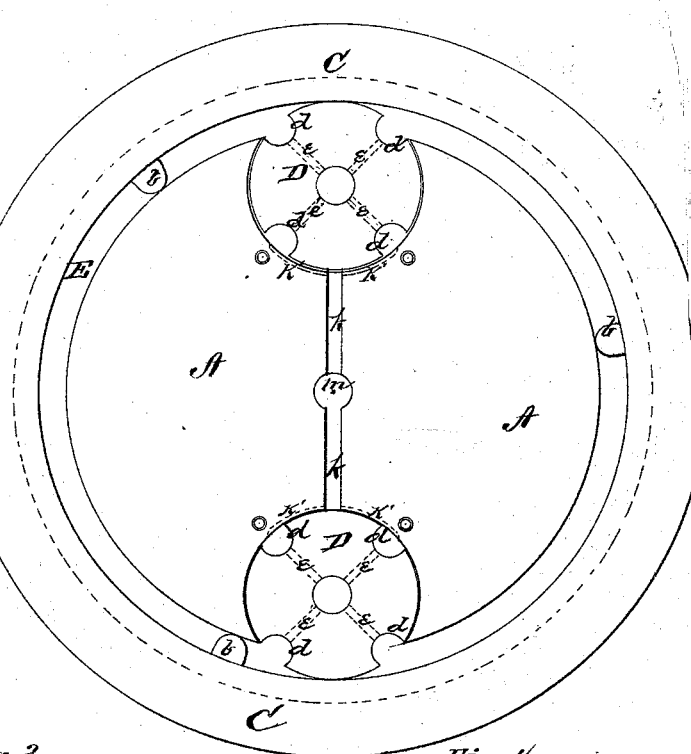
Figure 3:
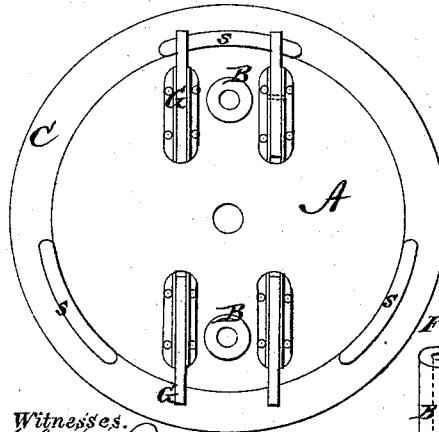
Figure 4:
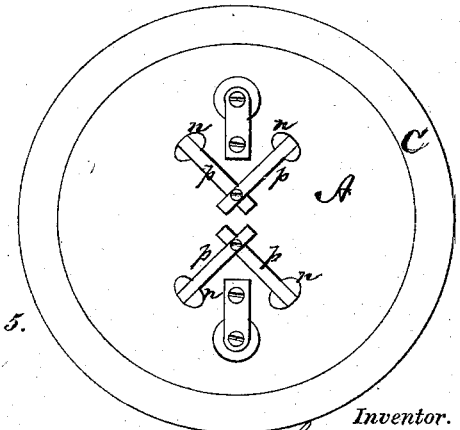
Figure 5:

Figure 1 is a perspective view of the striker or gage. Fig. 2 is a view of the mold. Fig. 3 is a perspective view of the mold-box.

A A are two light but strong pieces of wood or metal, which are united together at their upper ends by a strip of wood or a metal plate, B, the ends being secured by rivets, so that the opposite or lower ends of the pieces A A can be moved toward or from each other, as desired. C is a gage-board, which is mortised at each end so that the pieces A A can pass through the mortises and allow the gage-plate to be moved up and down along the length of the pieces A A, as required. A small wire, $d$, is then stretched between the lower ends of the pieces A A, a screw, $e$, serving to tighten or slacken it, thus forming what we shall call an improved striker. The side pieces A A can be marked with gaged lines for the purpose of properly adjusting the gage-board C.

I first take a barrel or keg of packed butter and remove the butter by knocking the barrel or keg to pieces so as not to disturb the solid contents. Then, having adjusted the gage-board C to the desired height, I draw the wire $d$ horizontally through the mass of butter, allowing the gage-board C to just scrape the top of the mass. This section I then remove and take off another section in the same manner until the entire mass has been cut into sections of equal height.

G G' are two semi-cylindrical thin sheet-metal plates, which, when placed together in the manner represented, form a cylinder of the size which it is desired to form the roll of butter. These two parts G G' have each a handle, $h$, secured to their upper ends, which cross each other, and are riveted at $i$. The ends of these handles are bent upward, so as to form a single handle, which can be grasped by the operator.

Now, it is evident that by forcing these handles apart the two parts of the cylinder G G' will be separated in the manner of the two blades of a pair of shears. The edge of the lower or open end of the cylinder can be sharpened or not, as desired.

The equal sections of butter having been properly disposed of upon a table, I then take this cylindrical mold and dip it into hot water, so as to properly heat it, and then I press the mold vertically down through each section as many times as the size of the section will permit, each time cutting out a roll of butter. Should any of the rolls stick in the mold they can be removed by separating the parts G G'. The rolls of butter thus obtained can then be wrapped and sent to market in a neat and firm condition.

The pieces of butter which will be necessarily left after cutting out the rolls, owing to the cylindrical shape of the mold, I will then place inside of a box or large mold, K, and subject to a sufficient pressure to condense them into a solid mass, and this mass I will cut into rolls by means of the cylindrical molds in the same manner as above described.

The four sides of the box or mold K are hinged to the bottom of the box, and are held in place by hooks and eyes $s\ s$ when folded together. This construction of the box or mold is necessary, in order that the pressed butter may be removed in bulk by opening out the sides after it has been properly pressed. A follower, $m$, is operated by a screw, $n$, in the manner of an ordinary screw-press, in order to compress the butter in the box.

J. S. FISHER.
Wheels for Road Steamers.

No. 137,065.   Patented March 25, 1873.

Witnesses.
John A. Ellis
Wm. L. Ellis

Inventor.
James S. Fisher
Per
C. H. Watson
Attorney